United States Patent [19]

Adams

[11] 3,716,834

[45] Feb. 13, 1973

[54] DATA TRANSMISSION SYSTEM WITH IMMUNITY TO CIRCUIT FAULTS

[76] Inventor: Henry G. Adams, Llewellyn park, West Orange, N.J. 07052

[22] Filed: Oct. 7, 1971

[21] Appl. No.: 187,284

[52] U.S. Cl. ..........340/147 R, 340/147 SC, 340/409

[51] Int. Cl. ..........................G08b 29/00, H04q 5/00

[58] Field of Search...340/147 R, 150, 151, 213, 147, SC, 340/409

[56] References Cited

UNITED STATES PATENTS

| | | | |
|---|---|---|---|
| 3,487,393 | 12/1969 | Medlinski | 340/213 R |
| 3,588,824 | 6/1971 | Barker | 340/147 R X |
| 3,653,041 | 3/1972 | McGrath | 340/409 |
| 3,601,806 | 8/1971 | Heimbigner | 340/151 |

*Primary Examiner*—Donald J. Yusko
*Attorney*—William C. Conner et al.

[57] ABSTRACT

A system for use with a data transmission network having a central station and a plurality of remote stations connected in series by a low grade transmission line such as a telephone pair. The system of the invention is immune to common transmission line faults, such as a line to ground short, a line open circuit, a line to line short, etc. and will continue to operate in spite of such faults. The system is also capable of identifying a transmission line fault when it occurs, the nature of the fault, and the approximate location of the fault in the network.

9 Claims, 6 Drawing Figures

DATA TRANSMISSION SYSTEM WITH IMMUNITY TO CIRCUIT FAULTS

The invention relates generally to data transmission systems having a central station and a plurality of remote stations, and particularly to the detection of, and the immunization to transmission faults in such systems.

An example of a data system in which the present invention may find application is a burglar alarm system. Typically, this includes a central station, which is manned, and a plurality of remote stations, which are not manned, and which are situated in the areas which are to be protected against burglary. The remote stations may be located at doors and windows of the premises being protected. The opening of the door or window activates the remote stations. The remote and central stations are connected together, typically by a low grade transmission line which is often a telephone line. These lines are leased from a telephone company, on a private line or semi-permanent basis, and the connections between the central station and remote stations are permanently or semi-permanently wired through the telephone company's central office and other switching points. To reduce the number of leased telephone lines, it is desirable to have a single line between the central station and the plurality of remote stations. Equipment has heretofore been developed in which a central station is connected by a single line to a plurality of remote stations. The central station sequentially interrogates each remote station with a pulse code and each station signals back with a pulse code information as to the status of the condition being monitored at the remote station. Thus, for example, if the remote station senses a door being either opened or closed, the remote station upon being interrogated will advise that the door is opened or closed as the condition may be. The remote stations are sometimes called transponders, i.e., devices which sense a physical condition, store an electrical signal proportional to this condition, and in reply to an interrogation electrical signal and send back a signal as to the status of the condition being sensed. By this arrangement, it is possible for a central station to sequentially interrogate a plurality of remote stations which are connected together by a single transmission line. An example of one such system is shown and described in U.S. Pat. No. 3,384,874. Such data systems depend upon the exchange of information over transmission lines between the stations. These lines are subject to commonly occurring transmission line faults such as line to ground short circuit, open circuit of the lines, double line to ground shorts, etc. An aspect of the present invention is a system which is immune to such common electrical transmission line faults. In other words, although there is a fault, e.g., open circuit, at a particular point in the system, the central station may continue to interrogate the remote stations, and the remote stations may reply to the central station in spite of the line fault. The invention achieves this immunity to line faults by a simple and elegant configuration which does not require multiple transmission lines, and thus does not require the additional expenses involved in leasing or in installing additional or redundant transmission lines. The system of the invention is simple in its design, and may be constructed with a minimum of parts and thereby achieve an attendant economy in its initial cost of manufacture.

It has recently become feasible and economically attractive to connect more and more remote stations to a single central station. The remote stations, moreover, may be spread out over a very large area. With such large systems it becomes acutely important to rapidly determine the occurrence of a break or electrical fault in the transmission path connecting the various stations, the nature of the fault, and where the fault has occurred.

An aspect of the present invention is a system which permits the rapid, almost instantaneous detection of a fault in the transmission line, and an identification of both the location of the fault, and the nature of the fault.

The advantages of the system of the invention which rapidly identifies the location of a fault in a burglar alarm system, or other data transmission system, are numerous and include warning of possible tampering with the system (and this is especially important in the case of burglar alarm systems); ease and speed of maintenance, in that, the region of fault can be located from the central station and a repair crew can be dispatched directly to the region of the fault, rather than have to search over the entire system. In addition the system of the invention identifies the nature of the fault, so the repair crew can look for this kind of fault when making the repair.

Another aspect of the system of the invention is that it can test the transmission path and the transmission portion of each remote station. This test can be done separately from the normal operation of the data collection system, and without the inclusion of any special equipment.

Although the previous introduction to the invention has described the invention as applied to a burglar alarm system, it should be understood that the invention is not limited for use in burglar alarm systems, but may be used in any data collection system. It will find particular application in proprietary low speed data systems. An example of such a data system is one in which a plurality of remote stations are measuring parameters in a chemical plant. The remote stations might measure pressure, temperature, liquid level in a tank, etc., and store the measurement in an electrical form in a suitable electrical register. Upon an interrogation signal from the central station, the contents of the register are transmitted back to the central station, thereby reporting at the central station the measurements of the various parameters. It will be obvious that the system of the present invention may be used in data transmission and collection systems in which there are a plurality of remote stations and a central station connected by a single transmission path.

The above and other objects features and advantages of this invention will be apparent in the following detailed description of an illustrative embodiment thereof which is to be read in connection with the accompanying drawings, wherein.

Figure 1:
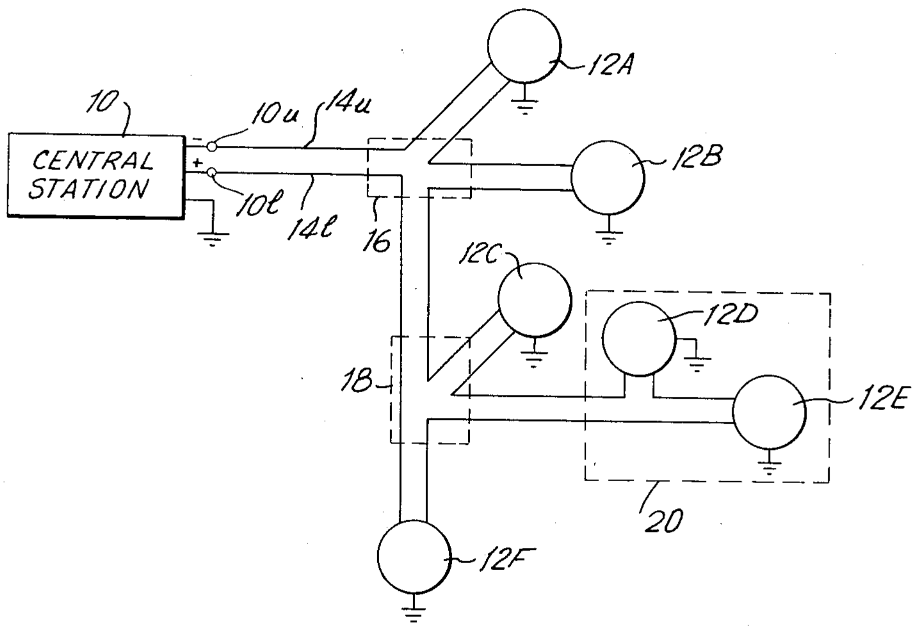
FIG. 1 is a block diagram of a data system using the invention.

Referring now to FIG. 1 there is shown a block diagram of a data system. In this diagram, a central station 10 is connected to a plurality of remote stations 12A through 12F, by a transmission line shown generally by legend 14. The line 14 typically is a low grade transmission line such as a telephone pair. Where leased telephone company pairs are used, the line 14 is wired from telephone company central offices 16 and 18 to the stations. The line 14 is typically just wired through the connecting terminals in a telephone company's central office, and none of the telephone central office equipment is included in the circuit. As shown in FIG. 1, remote stations 12A, 12B, 12C and 12F are at different remote locations, and remote stations 12D and 12E are at one location as shown by the dotted line 20. Where the system is used as a burglar or security alarm system, the remote station 12A for example, might sense the open-closed condition of a front door at one premises, and the remote stations 12D and 12E, might, for example, sense the open-closed condition of a front door and rear door at a different premises 20.

It is not intended that these remote stations will exchange data among themselves but that the remote stations will communicate only with the central station 10. It should be emphasized that the remote stations and the central station 10 and 12A – 12F are all connected in series.

The central station and remote stations 10 and 12A – 12F all have ground connections as shown by the grounding symbol. During normal operation, the central station 10 sends out a different interrogation pulse trains or codes on the transmission line 14. These pulse codes, are received by all remote stations. However, each remote station is responsive to only one pulse code combination. In reply to this pulse code combination, a remote station is activated and signals back to the central station a reply pulse coded signal indicative of the status of the condition being sensed at the remote station. For example, an interrogation pulse code is sent out from the central station which will activate remote station 12A only. In response to this signal, the remote station 12A is activated, and returns a signal to the central station advising of the status of the condition being monitored by remote station 12A. An illustrative example of pulse signaling in the present system is as follows: the central station 10 has two output terminals 10*u* and 10*l* connected to the two wires of the transmission line 14, at 14*u* and 14*l* respectively. In the absence of a pulse signal, the upper terminal 10*u* is maintained at −60 volts; and the lower terminal 10*l* is maintained at +60 volts. Current also flows from terminal 10*l* through the transmission line 14 and each remote station, and back to terminal 10*u*. Pulses are sent out by the central station by simultaneously applying ground potential on the output terminals 10*u* and 10*l* and over the transmission line 14. This also interrupts the current flow in the network. Thus, there is both a current and voltage pulse signaling from the central station. The remote stations 12 are sensitive to changes in voltage and current and thus sense the pulses sent out from the central station 10. The remote stations reply to the central station by open circuiting or breaking the transmission line. This is achieved in one embodiment by opening and closing a relay contact which is in series with the transmission line 14. The central station 10 is sensitive to line current variations and thus receives the transmitted information from the remote stations by detecting the abrupt variations (pulses) in line current. The central station is designed to sequentially interrogate each of the remote stations 12A through 12F and to receive reply pulses from each of the stations.

The present invention is both corrective of, or immune to, common faults (e.g., line to ground short, open circuit, etc.) in the transmission line 14, and also detects faults in the transmission line. Before examining how the system of the present invention is rendered immune, and faults are detected, it is best to describe the signaling portion of the central station and the signaling portion of the remote stations; the former, shown in FIG. 2 and the latter shown in FIG. 3.

Figure 2:
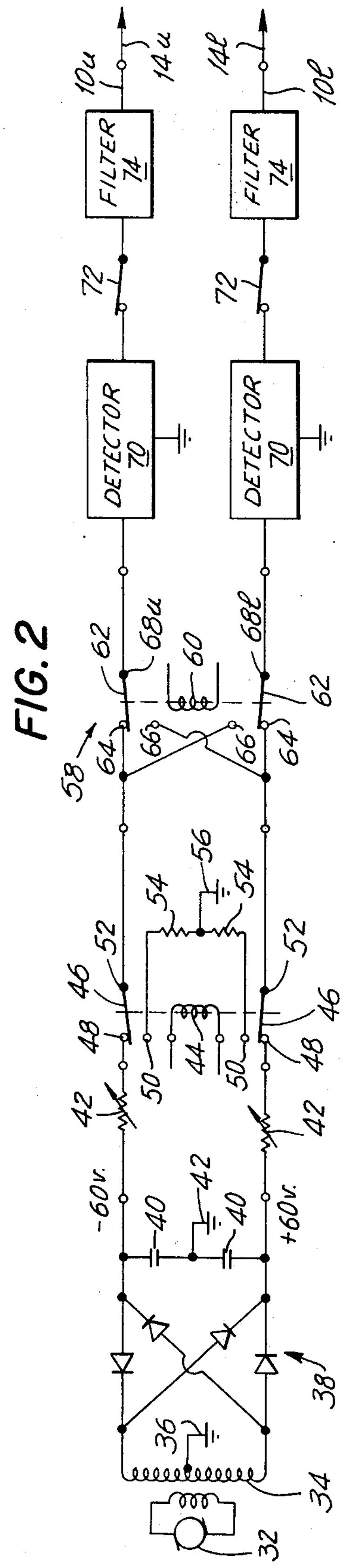
FIG. 2 is a schematic diagram of a portion of the central station shown in FIG. 1.

Referring now to the schematic drawing of a portion of the central station shown in FIG. 2, there is shown a source of an AC power supply 32 connected through a transformer 34 which is center tapped and grounded at 36. A full wave rectifier 38 is connected to the transformer and a pair of filter capacitors 40 are connected across the output of the full wave rectifier and are grounded at their common point as shown by legend 42. A typical power supply will provide a DC potential of −60v on one output and +60v on the other output. The outputs, of course, are at the outsides of the capacitors 40 where they joint the full wave rectifier 38. These measurements are made relative to ground potential. The power supply described (32 through 42) illustrates a typical balanced power supply, however, any convenient or conventional power supply might be used.

A pair of current limiting resistors 42 are inserted, one each in the output lines from the power supply. These resistors 42 are shown as adjustable resistors, and their resistance is selected so as to limit the current in the network. Typically, the two resistors are of the same value, and are of such size as to limit the current flowing through the network to about 8 miliamperes, (ma).

Signaling from the central station into the network is done by a keying relay whose output winding is shown here at 44. The relay includes a pair of movable contacts 46 each with two fixed contact terminals 48 and 50. The relay is shown in its normal, or unenergized position, with the movable contact 46 closed with the fixed contact 48. Each fixed contact 48 is connected to one of the variable resistors 42, and each fixed end 52 of the movable contacts 46 are connected (via other circuit components) to the transmission line network at 14*u* and 14*l*. Thus, in the normal, or unactivated condition of the relay the +60v and −60v potentials are passed from the power supply to the network.

The second fixed contacts 50 of the keying relay are connected respectively to a pair of terminating resistors 54. These resistors 54 are connected at their common point to ground potential as shown by legend 56. The resistance of resistors 54 is preferably equal to the resistance of resistors 42. The terminating resistors 54 serve two functions. First, to discharge the inherent line capacitance and to keep any pulse distortion similar whether the transmission line is charging or discharging.

When the keying relay is activated, movable contacts 46 break the connection with contacts 48, and make connection with the contacts 50. Thus, the transmission line and network is no longer connected to the +60v and −60v potentials, but is connected to ground potential at 56 through the terminating resistors 54. The keying relay is activated by a central station transmitter (not shown). The relay typically is energized or pulsed for short periods of time (e.g., each pulse one-fourth of a second). Thus, voltage pulse going from +60v and −60v to ground, and current pulses of 8ma and 0ma are sent out from the central stations. The pulse patterns used are typically pulse code modulation signals which activate a particular one of the remote stations. This type of signaling, and equipment for carrying out such signaling, is well-known to those skilled in the art.

A polarity reversing switch 58 is connected to the fixed terminals 52 of the movable contacts 46 on the relay. This switch is to be used to reverse line polarity and is needed in certain kinds of fault detection, e.g., open circuit in the line. The polarity reversing switch is shown here as being relay controlled and having a relay winding 60, and two movable contacts 62 each of which moves between two fixed contacts 64 and 66. The relay is shown in its normal, unenergized position with the movable contacts 62 connected to the fixed contacts 64. It will be noted that the polarity reversing switch is connected to two lines. The upper line normally has −60v potential and the lower line has +60v potential. The upper fixed contact 64 and the lower fixed contact 66 are connected to the upper conductor which receives −60v. The lower fixed contact 64 and the upper fixed contact 66 are connected to the lower line and have +60v potential. In normal operation (i.e. with the relay 60 unenergized) the contacts 62 and 64 are closed and the upper line output from the polarity reversing switch is at −60v potential, and the lower line output is at +60v potential. When the polarity reversing switch is activated, upper contact 62 makes connection with upper contact 66; while lower movable contact 62 makes electrical connection with lower contact 66. Thus, the polarity of the two signals at the output of the polarity reversing switch at **68*u* and 68*l* is reversed and there is a +60v potential at output 68*u* and a −60v potential at output 68*l***.

Two current detectors 70 are connected respectively to the output **68*u* and 68*l* from the polarity reversing switch. These detectors sense current pulse signals transmitted to the central station from the remote stations. The detectors will also sense the absence of such signals in the event of a fault in the line. These detectors may be any convenient or conventional current pulse detectors, and an example of one type of detector suitable for use in the present invention is shown and described below in FIG. 5**.

A pair of test switches 72 are connected one in each line at the output of the detectors 70. These switches are used to test the proper operation of the system.

A pair of filters 74 are connected to the test switches 72 with one filter connected to each switch. These filters are included to prevent the transmission or reception of out of band signals, and to limit the frequency and amplitude of any transmitted or received signals to a predetermined range so that neither the transmission network nor the stations will be damaged. The filters may include lightening arrestors. Such filters are commonly required where the transmission lines themselves are rented from a telephone company, and the filters have additional amplitude and bend width requirements for protecting the telephone company leased equipment. The output from the filters forms the output of the central station and is shown here with the legends **10*u* and 10*l*. This output is connected to the transmission line 14 at 14*u* and 14*l***.

In normal operation, the central station transmits pulse codes. These codes appear at the output terminals **10*u* and 10*l*. On output terminal 10*u*, the logic level "0" is normally −60v and the logic level "1" is ground. On the lower output terminal 10*l* the logic level "0" is +60v and the logic level "1" is ground. The pulse codes appear simultaneously at both output terminals 10*u* and 10*l*. In addition to the voltage signaling there is, of course, a corresponding current signaling where typically the logic level "0" is 8 ma, and logic level "1" is 0 ma. In normal operation, current flows from terminal 10*l* and returns on terminal 10*u*. The central station receives back signals from the network or remote stations by current pulses and these appear as an interruption in the normal current flow in the direction from terminal 10*l* to terminal 10*u***.

Figure 3:
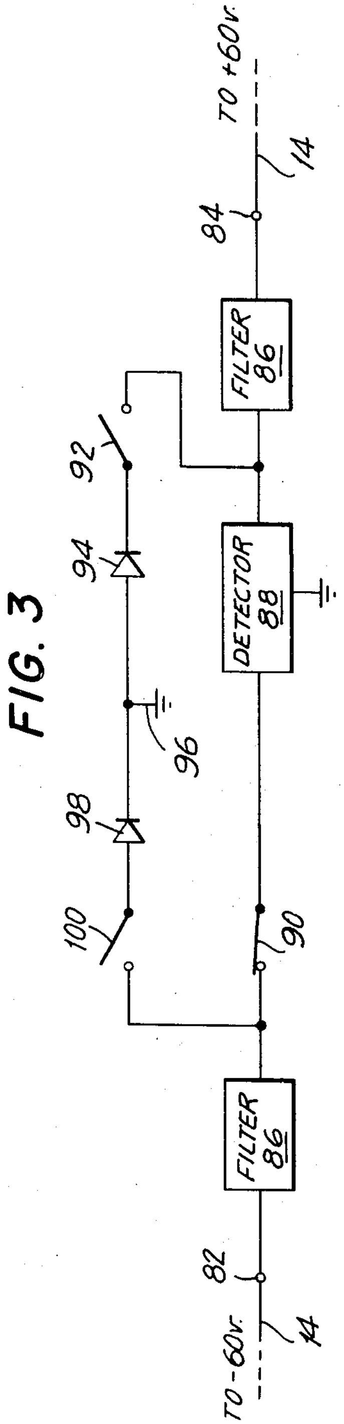
FIG. 3 is a schematic diagram of a signaling portion of one remote station shown in FIG. 1.

Referring now to FIG. 3, there is shown a schematic diagram of a signaling portion of one remote station. The remote station has two terminals 82 and 84 which are connected in series in the transmission line 14. Several remote stations are typically connected in series with a single central station, as shown in FIG. 1. Terminal 82 is connected towards the output terminal of the central station which is normally at −60V and which bears legend **10*u* in FIG. 2. Terminal 84 is connected to the output terminal of the central station which normally provides +60v potential and is shown in FIG. 2 as 10*l*. Only the first remote station in the network has its terminal 82 directly connected to the central station; and only the last remote station in the series has its terminal 84** directly connected to the central station; all of the other terminals of all of the remote stations are connected to the central station through other series connected remote stations.

A pair of filters 86 are connected one each to the terminals 82 and 84. These filters are similar to the filter 74 shown in FIG. 2 and protect the stations, and transmission paths, from unnecessarily large amplitude signals, and out of frequently range signals. A detector 88 is connected between the filters 86. The detector is any convenient or conventional current and voltage pulse detector. It receives the pulse interrogation signals sent out by the central station and applies them to the remote station decoding apparatus (not shown). It will be recalled that each remote station is responsive to a particular interrogation pulse signal or code sent out from the central station. In response to its particular interrogation signal, the remote station reports back, on the transmission line, to the central station, the status of the parameter or condition being monitored by the remote station.

A relay contact 90 is shown connected in series, in the conducting path between the filter 86 and the detector 88. Relay contact 90 is controlled by the transmitting equipment (not shown) in the remote station. Reply pulse signals are transmitted from the remote station, by opening this relay contact 90. The opening of the contact 90 interrupts the current flow from terminal 84 to 82, and in turn interrupts the current flow in the network (from the output of the central station at terminals **10*l* through the network to 10*u*). This change in current flow is detected by the detectors 70 (FIG. 2) in the central station, and is thereby received as the reply pulses to the interrogation signal. The frequency of the opening of the contact 90** for transmitting the reply pulses to the central station is typically one-half to 4 cycles per second.

Bridging the detector 88 and the relay contact 90 is the series combination of a first relay contact 92, a diode 94, and ground connection 96, a second diode 98 and a second relay contact 100. The two relay contacts 92 and 100 are operated by the same relay, (not shown) in the remote station transmitter (not shown), which operates relay contacts 90. Relay contacts 92 and 100, in their normal condition are open as shown in FIG. 3. The contacts are closed only when the output relay is activated and, i.e., when relay contact 90 is opened. The two diodes 94 and 98 are poled in the same direction, and in a direction which is opposite to the normal current flow in the remote station. Thus, when the remote station is sending a reply pulse signal, contacts 92 and 100 are closed, and contact 90 is opened — the diodes 94 and 96 are back biased and current cannot flow from terminal 84 to terminal 82 through the back biased diodes 94 and 98. The ground connection 96 is shown at the common point between the diodes 94 and 98. The components 92 – 100 play no part in the normal operation of the data collection system. The function of the diodes 94 and 98, and the relay contacts 92 and 100 and ground connection 96 will become apparent from the discussion of the immunity and fault detection operation of the system of the invention.

Figure 4:
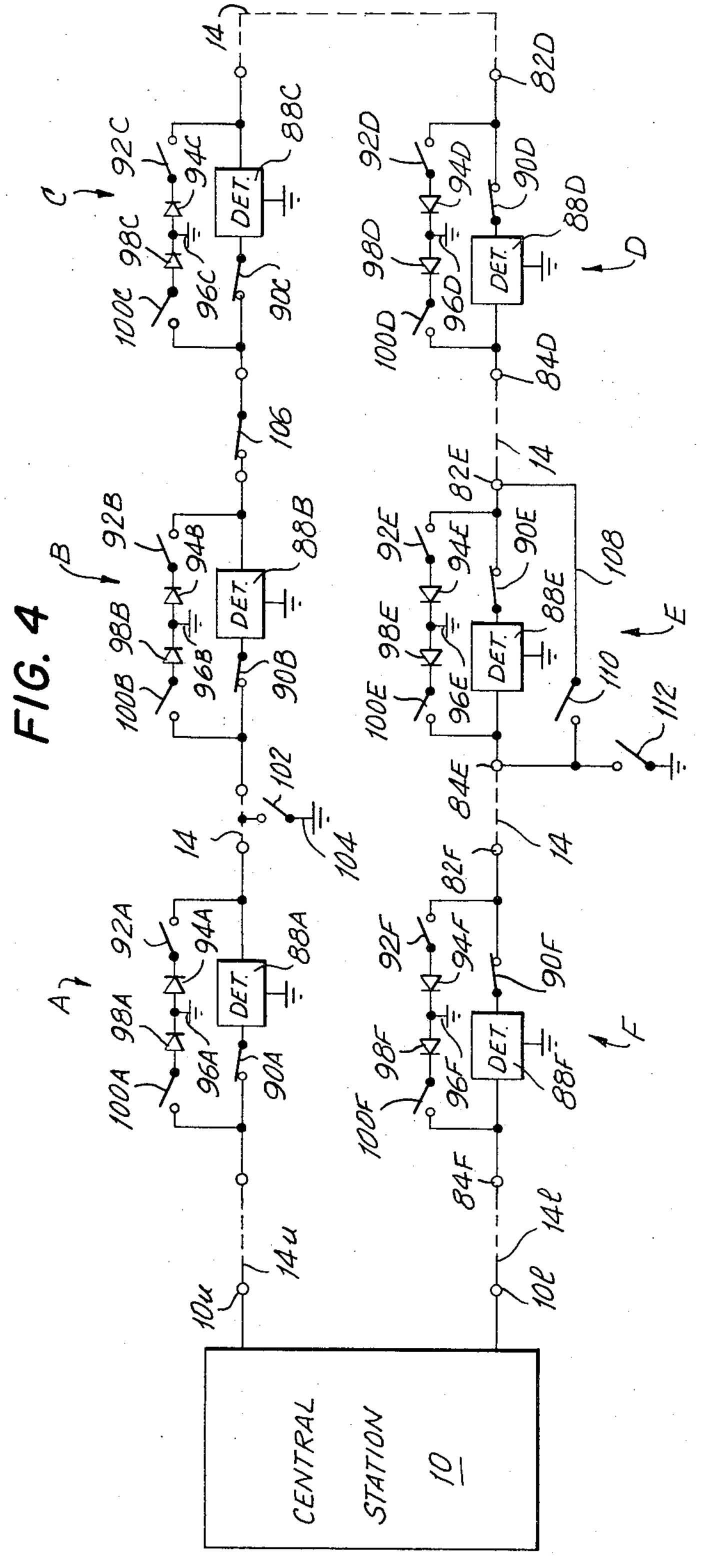
FIG. 4 is a block schematic diagram of a portion of the system illustrating the operation of the system during various types of faults.

Referring now to FIG. 4, there is shown a block schematic diagram of portions of the system of the present invention. This figure will be useful in illustrating and explaining the continued operation of the system in the event of a fault, and fault detection. The faults to be detected are the five most common types of transmission line faults. They are 1. Single short to ground;
2. Break in the transmission line, i.e., open circuit;
3. Remote station becoming disconnected at its terminals;
4. Line to line short;
5. Line to line to ground short.

In this FIG. there is shown a central station 10 connected by the transmission line 14 to to signaling portions of six remote stations identified as A – F. The signaling portions of the remote stations shown in this FIG. are similar to FIG. 3. Elements which are common to FIG. 4 and the preceding FIGS. 1, 2, and 3 bear like legend; however, the suffix A – F may be added to the legends to identify particular remote stations in FIG. 4.

Before considering the operation of the network under transmission line fault conditions, it might be helpful to review its normal operation. Current flows from terminal **10*l* of the central station 10 through the transmission line 14 to remote station F then through line 14 to remote station E, etc. through line 14 and stations D, C, B, and A back to terminal 10u at the central station 10. Pulse signals sent out by the central station 10 are received by all the detectors 88A – 88F. Each remote station which is interrogated answers by opening the relay contact 90 in an intermittent pulse fashion and thereby provides current pulses in the transmission line. These current pulses are received at both terminals 10*l* and 10*u* of the central station and detected by both detectors 70 (FIG. 2) which are connected to terminals 10*l* and 10*u***. (A remote station identification pulse signal may accompany the replay information so the central station may determine which remote station is replying with greater certainty.)

A first fault condition is a line to ground fault. It may occur for example, in the transmission line 14 between stations A and B, and shown in the drawings as the closing of a switch 102 which is connected between the line 14 and ground 104. Interrogation pulse signals are received by all remote stations, because remote station detectors 88 are current sensitive and transmitted current pulse flow from the station 10 to ground at the fault 102, 104. The reply pulse signals are received at only one of the terminals **10*l* or 10*u*, and not at both terminals, as during normal operation. In the present example, rely signals will be received from station A on terminal 10*u*, due to current flowing from ground 104 through the short at 102, to station A and through detector 88-A reply relay 90-A and then over transmission line 14 to central station 10*u*. The interruption of the current flow by reply relay 90-A will not be transmitted to the right of the line fault at 102, and thus a constant current flows from the lower terminal 10*l* while station A is replying (i.e., current flow from terminal 10*l* through stations F, E, D, C, and B and then through the fault 102 to the ground at 104. Similarly, a reply from station B (due to the opening of relay 90-B) will be received only on the lower terminal 10*l* of the central station; while the upper terminal 10u** of the central station will receive a constant current. This flow of signal advises a central station operator that there is a line to ground fault located between stations A and B.

Thus, the system operates in spite of a line to ground fault. The fault is (1) diagnosed at the central station as a line to ground fault because the reply signals are received on only one central station detector, and (2) the location of the fault is identified as occurring in the transmission path between the last station which replies on one line (i.e., station A) and the next station which replies on the other line (i.e., station B).

The second kind of fault is a break in the transmission line or an open circuit. This is illustrated as occuring for example between stations B and C and is shown schematically as a switch 106 connected in the line 14 between these two stations. It will be appreciated that when an open circuit occurs interrogation pulse signals from the central station will still be received by the remote stations since the detectors in the remote stations are voltage sensitive as well as current sensitive. However, the remote stations cannot signal back, as there is not current conducting path with the network open circuited.

When an open circuit fault occurs, current flow ceases in the network. This is sensed by the detectors 70 (FIG. 2) in the central station 10. In response to the ceasing of current, the polarity reversal switch 58 (FIG. 2) is activated and a +60v potential is applied at central station output terminal **10*u*, and a −60v potential is applied at output terminal 10*l* of the central station. With the polarity reversed from the central station there is now provided at least one current conducting path for each remote station to reply to the central station. The operation of the network may be traced as follows. Interrogation pulse signals are sent out from the central station at terminals 10*u* and 10*l* (the polarity of the logic "0"being reversed, and the logic "1" being ground potential as before). Each remote station receives the interrogation signals, and when interrogated replies thereto. Consider for example, station A replying. It will be recalled that the replying pulse code is fed to the transmission line by opening the contact 90-A and closing the contacts 92-A and 100-A. For each pulse, contact 100-A closes and current flows from the central station terminal at 10*u* (which is now +60v) through contact 100-A forward biased diode 98-A and to ground at 96-A. Thus, current pulses are received at terminal 10*u* of the central station. There is no signaling to the lower terminal 10*l* because of the open circuit 106 between stations B and C. Similarly, station B replies to interrogation signals through current pulses received at the upper terminal 10*u*. Specifically, there is a current flow path from terminal 10u (+60v) which passes through station A, contact 90-A and decoder 88-A, through the transmission line, to station B and through closing of relay contact 100-B and diode 98-B to ground 96-B. Again, no reply signal from station B is received on the lower terminal 100*l* of the central station because of the open circuit at 106. However, all stations to the right or other side of the break 106 reply to the central station 10 on the lower terminal 10*l*. Thus, station C replies to interrogation signals by opening contact 90-C and closing contacts 100-C and 92-C. Current cannot flow from station C to the upper terminal 10*u* of the central station 10 because of the open circuit at 106. However, current pulses flow from ground at 96-C through diode 94-C, contact 92-C, transmission line 14, stations D, E, and F, to the lower terminal 10u. (It will be noted that the polarity at terminal 10*u*** is −60v).

The open circuit or break fault in the transmission line is sensed in the system by a stop in the flow of current. This is followed by a reversal of the polarity of the signals at the central station output terminal. Signaling continues between the central and remote stations. However, reply signals from the remote stations are received on only one of the two detectors in the central station. The open circuit fault is located by observing which stations reply on one detector, and which stations reply on the other detector. The fault is identified as occurring in that section of the line between those stations which reply on one detector and those stations which reply on the other detector. Thus, the system detects an open circuit fault, continues operation in spite of an open circuit fault, and locates the region of the fault.

A third type of fault is when a remote station becomes disconnected from the network. For example, consider station D as becoming disconnected at its terminal connections 82-D and 84-D. The central station 10 senses this as an open circuit, current flow ceases and the polarity reversal switch 58 in the central station is operated. Stations A, B, C will reply to interrogation signals only on the line connected to the upper terminal **10*u* of the central station and will not reply on the line connected to the lower terminal 10*l*. The replies from stations E and F will only be received on the lower terminal 10*l* and not to the upper terminal 10*u***. Station D will not reply at all. The current flow paths for the reply of stations A, B, C, E, F is similar to that traced above in connection with the single open circuit, and need not be repeated here. Thus, the central office can continue to monitor the replying stations and also know that station D has been disconnected.

Where the system of the invention is used in a burglar alarm or security alarm, this is an indication of a malfunctioning at station D. The break at D may be due to natural causes in which event station D is no longer protected by the remote station there. Alternatively, the disconnecting of station D may be due to human intervention, burglars often cut the electrical protection system upon entering a premise. Thus, in a burglar alarm system, a warning indicates that a guard should proceed to station D to investigate for possible intruders in the area, and to protect the area until the remote station can be repaired. It might be noted that the remainder of the stations in the network continue to function although one portion of the station is malfunctioning.

A fourth type of fault is a line to line short across a remote unit. This fault is shown schematically on remote station E as a shorting line 108 connected across the station's terminals 82-E and 84-E and having a relay 110 in the line. When such a fault occurs all other stations, i.e., A, B, C, D, F will reply and function in the normal manner. Station E, however, will not reply. At the central station 10 when a remote unit E does not reply, the polarity reversing switch 58 (FIG. 2) is activated and one of the disconnect switches 72 (FIG. 2), for example the upper switch, is opened. Thus, at the terminals of central station 10 the upper terminal **10*u* is disconnected, or open circulated, and the lower terminal 10*l* has −60v potential. An interrogation pulse signal is sent out from the lower terminal 10*l* for remote station E. Interrogation signal is received by decoder 88-E (since the decoder is voltage sensitive). Remote station E replies by closing relay contact 92-E. Current flows from ground at 96-E through diode 94-E, contact 92-E to terminal 88-E and then through transmission line 14 to station F and back to the lower terminal 10*l* of the remote station. Alternatively, the central station might interrogate the remote station, having a short across its terminals, through its upper terminal rather than through its lower terminal. Here, of course, the lower switch 72 (FIG. 2) would be opened, and the upper switch 72** would be closed. Thus, the pressure of the line to line short across a remote station is detected by the failure of that station to reply while the system is operating in the normal mode. To interrogate the remote station, the polarity reversal switch is activated, one side (it may be either side) of the central station is opened and interrogation signals are sent out from the other side. The remote station replies on the other terminal. The location and the nature of the fault is thus diagnosed from the central station. The remote station may also be operated even though there is a fault in the transmission line.

The fifth type of fault is a line to line to ground short at a remote station. Station E, in FIG. 4, has this line to line short across its terminals 82-E, 84-E, shown by the connection 108 and switch 110 being closed, and the "to ground" short shown by a switch 112 closing the line to line short to ground. This type of fault is diagnosed at the central station as a line to ground short occurring between stations D and F. For line to ground short see the explanation above concerning line to ground faults. The unit E will not reply under any circumstances, and cannot be interrogated under any circumstances. This provides a warning to the central station to dispatch a repair crew or other suitable personnel to location E. It should be noted, however, that the remainder of the system, stations A, B, C, D, and F will continue to operate and reply to interrogation signals.

Figure 5:
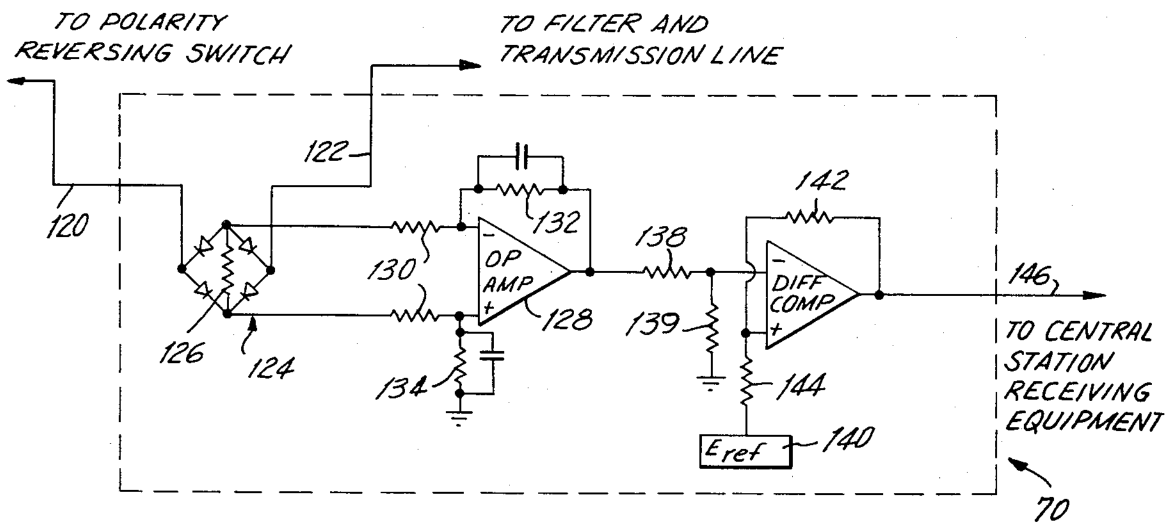
FIG. 5 is a schematic diagram of a detector for use in the central station of FIG. 2.

Referring now to FIG. 5, there is shown a schematic diagram of a current detector, of the kind which may be used for detector 70 in the central station of FIG. 2. Current signals flow on the lines 120, 122. In this example, the line 120 is connected to the polarity reversing switch 58 of FIG. 2, and line 122 goes to the test switch 72, filter 74, and then to the transmission line 14. Lines 120 and 122 are connected to opposite arms of a bridge rectifier 124. A resistor 126 is connected across the remaining two arms of the bridge rectifier 124 so that uni-directional current flows through the resistor 126 regardless of the direction of current flow in the lines 120, 122, An operational amplifier 128 is connected across the sensing resistor 126. A pair of input resistors 130 are between the operational amplifier and the current sensing resistor 126. A feed-back resistor 132 joins the output of the operational amplifier back to one input terminal. A load resistor 134 is connected between the second input to the operational amplifier and ground or reference potential. The proper selection of resistors 130, 132 and 134 will cause the output voltage of the operational amplifier to be proportional to the current flow through the resistor 126. The actual line to ground voltage measured from resistor 124 to ground will have no effect on the output signal from the operational amplifier 128. This is a common mode rejection circuit and it is well known to those skilled in the art, and thus its operation need not be explained further. The output of the operational amplifier 128 is coupled to a differential comparator circuit 136, through a resistor 138 which is bridge to ground by a second resistor 139. A reference potential, E ref, is shown at 140 and is connected to the second input of the differential comparator 136. When the voltage at the junction of the resistor 138 and 139 is more positive than the potential of the reference voltage at 140, the output from the differential comparator 136 will be at a logic level zero, when less than this amount, the output from the differential comparator will be at logic level 1. A feed-back resistor 142 is connected from the output of the differential comparator 136 to the second input and a resistor 144 joins the reference potential at 140 to the second input terminal of the differential comparator. These resistors 142 and 144 provide the necessary amount of hysterisis in the transfer characteristics of the differential comparator. The operation of the differential comparator is well known to those skilled in the art and the circuit associated therewith, therefore, need not be discussed in further detail. In summary, the function of the detector circuit of FIG. 5 is to translate current pulses, regardless of their polarity, into digital pulses. The output from the differential comparator is provided on a conductor 146 and is a series of voltage pulses which are applied to the central station receiving equipment (not shown).

Figure 6:
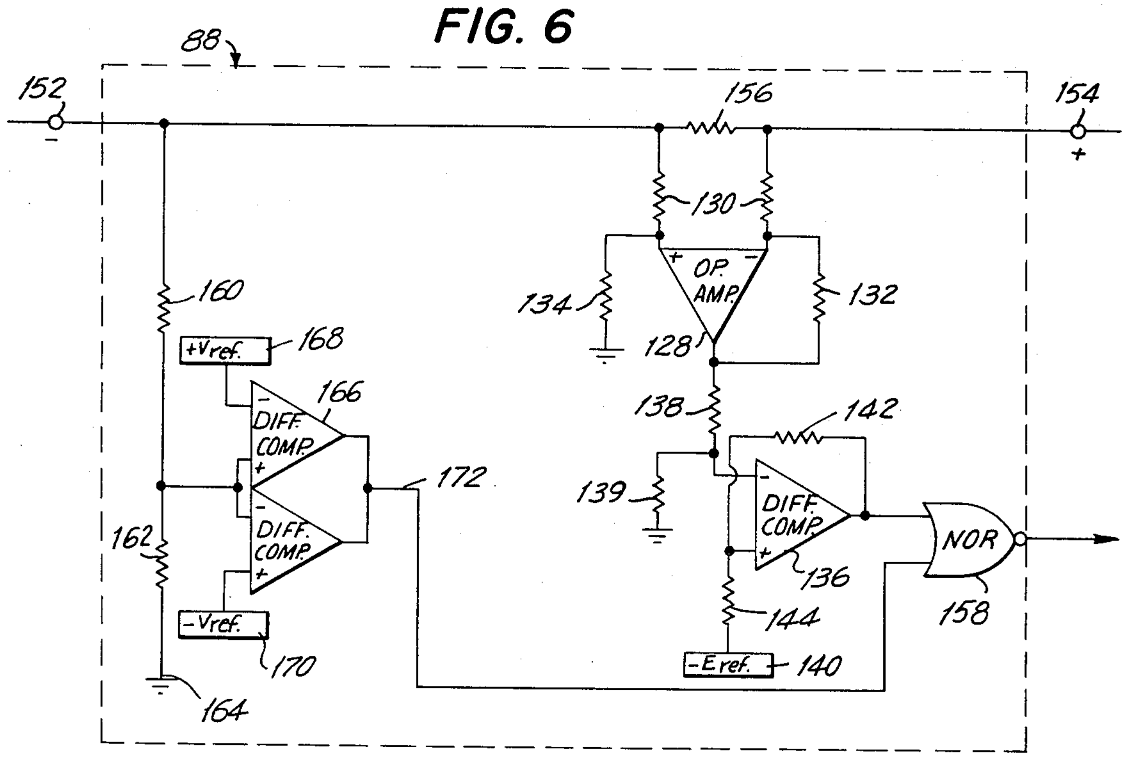
FIG. 6 is a schematic diagram of a detector for use in the remote station of FIG. 3.

Referring now to the drawing of FIG. 6, there is shown a combined voltage and current detector of a kind which may be used in detector 88 in the remote stations. The connection to the transmission line is shown at terminals 150*and* 152. These are the terminals which in a specific detector would be connected respectively to the relay contact 90 and to the filter 86, as shown in FIG. 3. A current sensing resistor 156 is connected in series with the transmission line between the terminals 150 and 152. A current sensing circuit is connected to sense the potential drop across the current sensing resistor 156. It will be appreciated that this circuit is similar to the one shown and described in FIG. 5 and like elements bear like legends. Thus, a description of the structure, and its operation need not be repeated. Comparison of the two circuits will reveal that the bridge rectifier 124 of FIG. 5 is not included in the circuit of FIG. 6 since current flow will be unidirectional. The output of the differential comparator 136 is applied to a NOR gate 158. The line voltage is sensed by a pair of divider voltages 160 and 162 which connect the line at 150, 152 to ground 164. The midpoint of these two resistors is connected to a dual differential comparator 166. The second input to both of these dual differential comparators is a reference potential shown at 168 and 170. The dual differential comparator is a conventional circuit which is well known in the art, and its detailed operation need not be explained here. The overall operation of the voltage sensing circuit may be summarized as follows: the output from the voltage sensing circuit on terminal 172 will be at logic level "1" when the voltage at the junctions of the resistors 160 and 162 is more positive that one reference potential 168, or more negative than the other reference potential 170. In the middle range, the output signal from the dual differential comparator 66 on conductor 172 will be at logic level "0". The outputs for both current sensor and the voltage sensing circuit are applied to the NOR gate 158. This OR gate has the characteristics that it will produce a logic level "0" signal when either voltage and/or current are present in the transmission line 150, 152, and will produce a logic level "1" when there is neither current in the line and a potential less than the predetermined amplitude of the reference potentials. The current and voltage detector of FIG. 6 is an example of a conventional circuit. Any other convenient or conventional current and voltage detector might be used. It may be electronic, or it may be a relay circuit of the kind which is also known to those skilled in the art. The output from the NOR gate 158 is applied to a register and decoder (not shown) in the remote station which determines whether the received pulses are interrogation pulses, which will trigger the remote station to reply on the transmission line. Thus there has been shown in FIGS. 5 and 6 two typical circuits which may be used for the current detector and current voltage detector. As described throughout this application, electronic components have been used. It will be appreciated that the various pulsing arrangements may be used with semi-automated equipment in the central station. In particular, electronic comparators can determine whether current is flowing during a normal condition. This will indicate an open circuit condition. In reply to a failure of current, the polarity reversing switch 58 may be automatically operated. Furthermore, the remote stations may be then automatically interrogated in a sequential fashion and measurement made on which of the two terminals of the central station reply signals are being received. This data may then be analyzed and a print out provided indicating first the nature of the fault, and second, the approximate location of the fault. In a less sophisticated system, the monitoring might be done manually (in a simpler system, the detectors in the central station might be ameters) and the interrogation signals might be sent out under the control of an operator, who by comparing the transmitted signals and the reply signals, can determine the location of the fault. The system of the invention, however, is not limited to an automated or manual system.

A further aspect of the invention is a test system which may be described as follows: a pattern may be set up to determine if the diodes 94 and 98 and switches 92 and 100 at each remote station are properly functioning. This may be done by operating the polarity reversal switch 58 in the central station and then first breaking one side of the line, e.g., opening the upper switch 72 in the central station, and determining if all of the remote stations are able to transmit a reply in response to an inquiry from the central station. The process is then repeated, but with the lower switch 72 opened and the upper switch 72 closed. This tests the diode to ground return path for each remote station. Thus, the present invention includes the further feature of a self-test or diagnosis of portions of the transmission path of each remote station.

Thus, there has been shown and described a system having a central station, and a plurality of remote stations connected in series and in which the common types of electrical faults in the transmission path do not render the system inoperable. Furthermore, the system of the present invention diagnoses the nature of the fault, and identifies the area of the fault.

What I claim is:

1. A system for use with a transmission line comprising a central station adapted to be connected to the ends of said transmission line, and including means for impressing electric signals on both ends of said line, said central station including means for transmitting information into said transmission line by varying the signals applied to both ends of said transmission line; a plurality of two-terminal remote stations adapted to be connected in series by said transmission line, said remote station including means responsive to said signals received at either terminal of said remote stations, and said remote stations including means responsive to said varying signals for providing information to said central station by altering the electric signal at the terminals of said remote stations; and said central station including means for receiving said information from said remote stations via said transmission line by sensing the altering of said electrical signals as received at each end of said transmission line whereby in addition to transmitting information in the system a fault in the transmission path may be identified by comparison of the signals simultaneously received at both ends of the transmitted line at the central station.

2. A system according to claim 1 wherein said electric signals are non-identical signals and further comprising means for connecting said stations to a source of reference potential, said central station transmitting means including pulsing means for switching both ends of said transmission line from said electric signals to said reference potential, and said remote stations responsive means altering said electric signal by interrupting the current flow of said electric signal in said transmitting line.

3. A system according to claim 2 wherein said remote stations responsive means for interrupting the current flow in said transmitting path includes a first switch, in transmission line.

4. A system according to claim 3 wherein there is connected in parallel with said switch a series combination of a pair of diodes poled in the same direction, two switches, and means for making connection to the reference potential, said diodes being poled in a direction to oppose normal current flow of said electric signal and said switches normally being closed but being operated when said first switch is opened, one of said switches being connected to each of said diodes.

5. A system according to claim 4 wherein said central station further includes a polarity reversing switch for interchanging said electric signals applied at said ends of said line.

6. A system according to claim 5 further including means for operating said polarity reversing in response to failure of said electric signal to normally flow in said transmission line.

7. A system according to claim 5 wherein said central station includes switches in each of said transmission lines for selectively interrupting said electric signal in each of said lines.

8. A system according to claim 4 wherein said detection means further includes means for comparing the simultaneous receipt of signals from said remote stations, and providing a warning signal when said signals are not received on both sides of the transmission line.

9. A system according to claim 8 wherein said central station has means for detecting which remote stations are providing information on one central station terminal, and which are providing information on the other terminal.

* * * * *